(12) United States Patent
Ciecko

(10) Patent No.: US 10,264,392 B2
(45) Date of Patent: Apr. 16, 2019

(54) LOCATION AND ACTIVITY AWARE CONTENT DELIVERY SYSTEM

(71) Applicant: Brendan Ciecko, Boston, MA (US)

(72) Inventor: Brendan Ciecko, Boston, MA (US)

(73) Assignee: CUSEUM, Inc., Boston, MA (US)

( * ) Notice: Subject to any disclaimer, the term of this patent is extended or adjusted under 35 U.S.C. 154(b) by 10 days.

(21) Appl. No.: 15/785,556

(22) Filed: Oct. 17, 2017

(65) Prior Publication Data
US 2018/0048996 A1 Feb. 15, 2018

Related U.S. Application Data

(63) Continuation-in-part of application No. 15/196,928, filed on Jun. 29, 2016, now abandoned.

(51) Int. Cl.
*H04W 4/021* (2018.01)
*H04W 4/02* (2018.01)
*H04W 4/21* (2018.01)

(52) U.S. Cl.
CPC .......... *H04W 4/021* (2013.01); *H04W 4/023* (2013.01); *H04W 4/21* (2018.02)

(58) Field of Classification Search
CPC ....... H04W 4/02; H04W 4/021; H04W 4/023; H04W 4/029; H04W 4/04; H04W 4/025; H04W 4/80; H04W 68/00; H04W 4/21; G06Q 30/0261; G06Q 30/0255; G06Q 30/0224; H04L 67/18; H04L 67/22; H04M 2250/10; H04M 2250/12
See application file for complete search history.

(56) References Cited

U.S. PATENT DOCUMENTS

| 2014/0280516 A1* | 9/2014 | Flowers | ............ G06F 17/30241 709/203 |
| 2015/0073907 A1* | 3/2015 | Purves | ................... G06Q 20/32 705/14.58 |

* cited by examiner

*Primary Examiner* — Quoc Thai N Vu
(74) *Attorney, Agent, or Firm* — Robert Schuler

(57) ABSTRACT

A location and activity aware content delivery system stores a plurality of instances of media content relating to known locations, and each of the instances of media content that are not generated by a mobile device user at the time the user is engaged in an activity proximate to the known locations. The system detects a current mobile device user location, emotional response and activity, selects an appropriate stored instance of media content and delivers the selected media content to a friendly user if the emotional response is positive, and does not deliver the selected media content if the emotional response is negative.

14 Claims, 12 Drawing Sheets

FIG.4A  INDOOR OBJECT LOCATION MAP 132A

| BEACON ID | OBJECT_ID |
|---|---|
| B.1 | OBJ.100 |
| B.2 | OBJ.101 |
| B.3 | OBJ. 109 |
| . | . |
| . | . |
| B.100 | OBJ.200 |

← ACCESS BY SEL. LOGIC

FIG.4B  OUTDOOR OBJECT LOCATION MAP 132B

| GPS COORDINATES | OBJECT_ID |
|---|---|
| LAT./LONG. | OBJ.100 |
| LAT./LONG. | OBJ.101 |
| . | . |
| . | . |
| LAT./LONG. | OBJ.200 |

← ACCESS BY SEL. LOGIC

FIG.4C  INDOOR/OUTDOOR OBJECT LOCATION MAP 132C

| CAPTURED IMAGES | OBJECT_ID |
|---|---|
| IMAGE.00 | OBJ.100 |
| IMAGE.01 | OBJ.101 |
| . | . |
| IMAGE.NN | OBJ.200 |

← ACCESS BY SEL. LOGIC

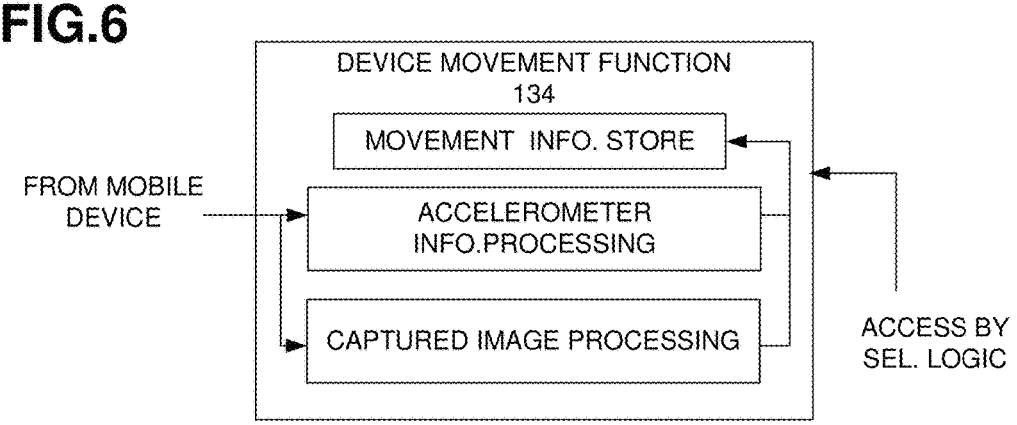
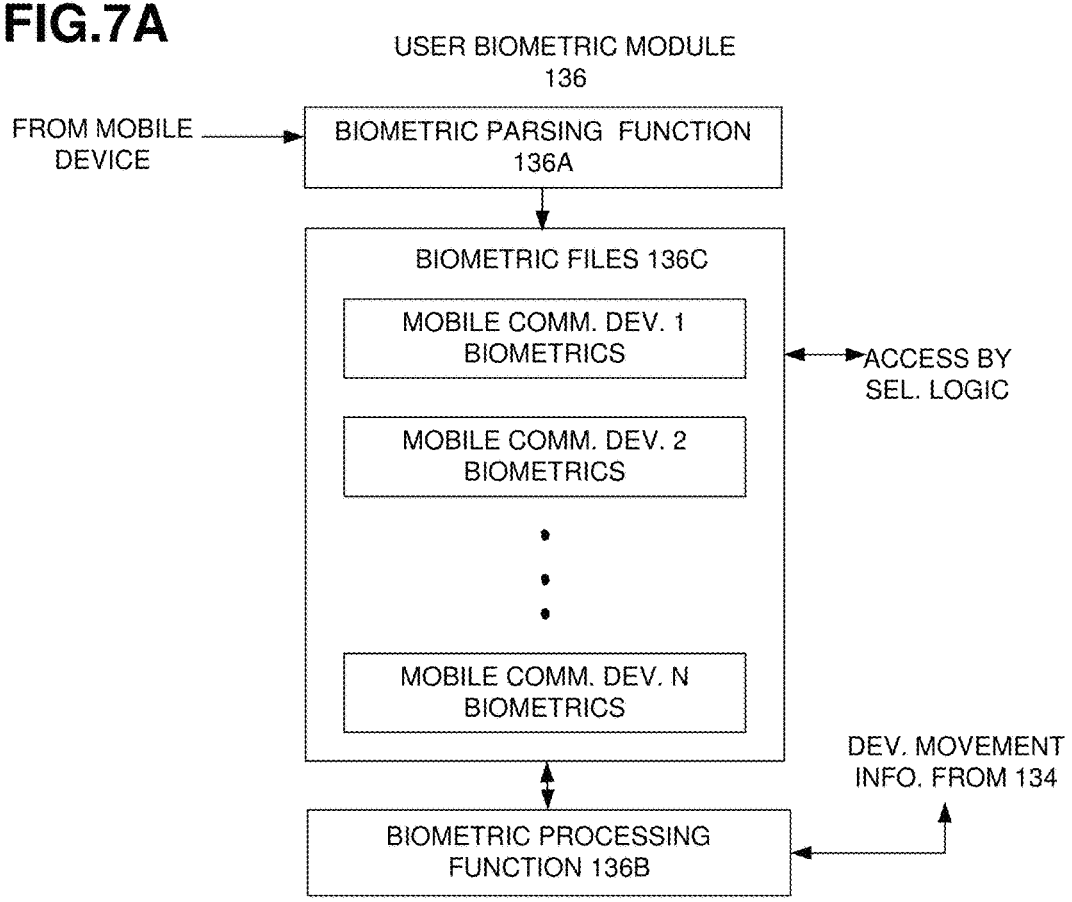

CONTENT INSTANCE - LONG FORMAT

CONTENT INSTANCE ID: 100

ARTIST NAME: UNKNOWN

TITLE: The Blue Bird

ID OF COLLECTION: Nature Still Life

IMAGE: [Still Image]

DESCRIPTION: Still life of blue bird.

LOCATION: Gallery A, LOCATION.123

DATE OF CREATION: 1955

DIMENSIONS:

PERIODS AND STYLES: Contemporary

GEOLOCATION: BEACON B.50

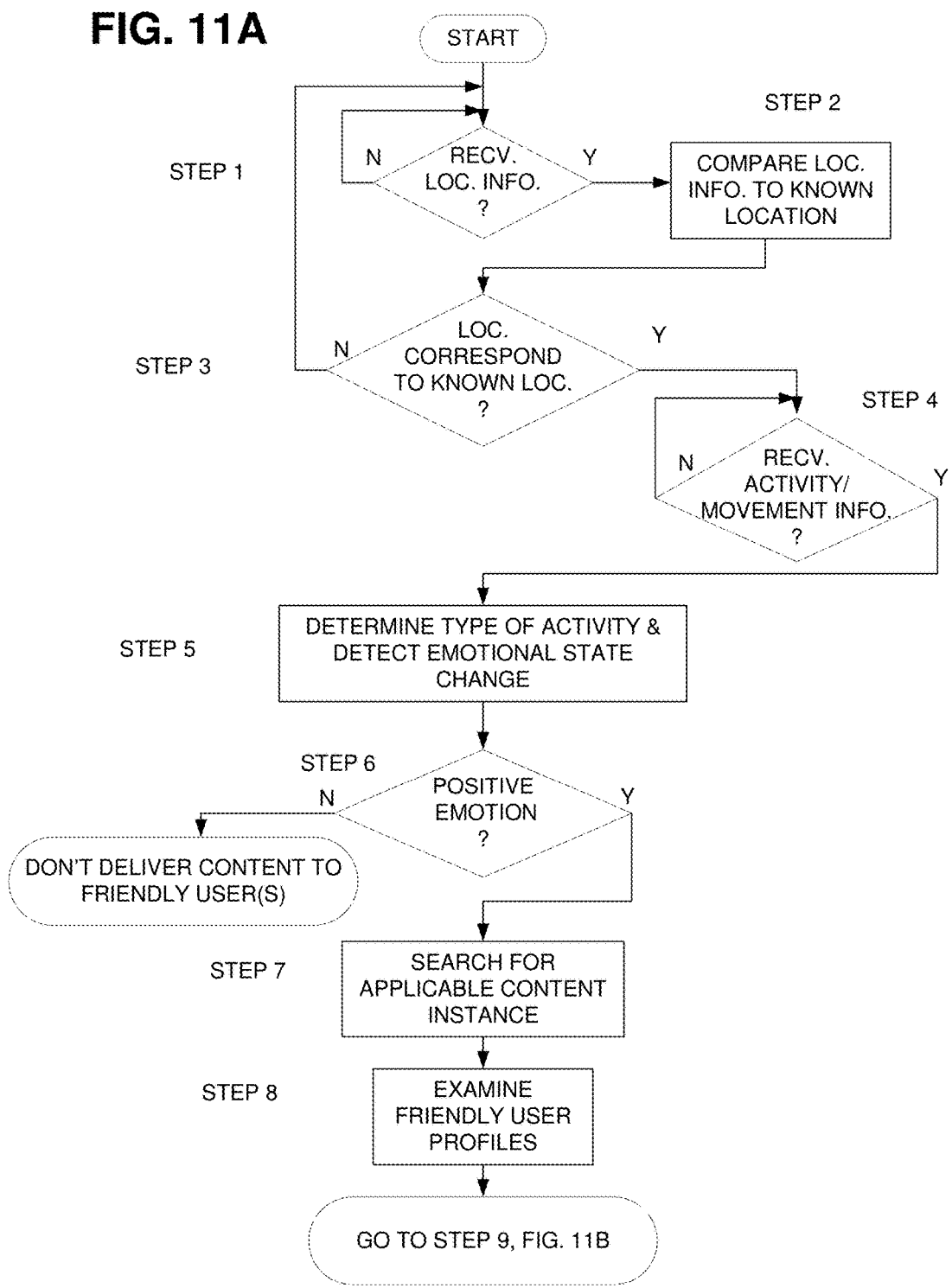

LOCATION AND ACTIVITY AWARE CONTENT DELIVERY SYSTEM

CROSS REFERENCE TO RELATED APPLICATIONS

This application claims the benefit under 35 U.S.C. § 120 of U.S. patent application Ser. No. 15/196,928 entitled "LOCATION AND ACTIVITY AWARE CONTENT DELIVERY SYSTEM", filed Jun. 29, 2016.

FIELD OF THE INVENTION

The present disclosure relates generally to the delivery of media content based upon a location and activity of a mobile communication device user.

BACKGROUND

With the proliferation of wireless connectivity to networks that permit access to information stored in association with computational devices (i.e., servers) connected to these networks, a very large number of applications (mobile applications) are being developed that are compatible to run on mobile communication devices. During the time that a mobile device is connected to a wireless network, a user of the device is able to search for and down-load information that they are interested in, and which is germane to their current geographic location. At some point, network developers and mobile communication device developers realized that implementing geographic positioning system (GPS) functionality in a mobile communication device allowed the current location of a mobile device to be easily tracked, and this current geographic position information could be used as the basis for identifying information to be delivered to the mobile device. Such location based information delivery applications (Location Aware Content Delivery) can be configured to request or pull location dependent content from a network, or these applications can be configured to automatically accept certain type of content that is of interest to the device user. Regardless of the method, the delivery of information to a mobile device based upon the current location of that device was a step forward in the development of mobile application functionality.

Social networking applications are available that permit groups of people to befriend one another and to share their activities and experiences with other friendly members of the group. In this regard, and among other things, friends can easily communicate what they are doing, where they are doing it, and whether they like what they are doing or not. Social networking services have designed their applications to operate with geographic positioning service functionality so that all members of a friendly group can know, in real-time, where other members of the group are located. More recently, functionality associated with social networking services has been combined with services that deliver content based on awareness of a mobile user's location, so that content can be delivered to friends in a social networking group based upon each friend's current location. Information delivered in this manner can be related to comments a member of the group makes about a restaurant, a store, an art gallery, museum, or any other location based activity, and this information can be delivered when any member of the group is located proximate to the restaurant, store, art gallery or museum.

BRIEF DESCRIPTION OF THE DRAWINGS

The present invention can be best understood by reading the specification with reference to the following figures, in which:

FIG. 4A is a diagram showing the format of an indoor object location map 132A.

FIG. 4B is a diagram showing the format of an outdoor object location map 132B.

FIG. 4C is a diagram showing the format of a captured image map 132C.

FIG. 6 is a diagram showing functionality comprising a mobile device movement module 134.

FIG. 7A is a diagram showing functionality comprising a user biometric module 136.

FIGS. 11A & 11B are diagrams illustrating the flow of content selection logic.

DETAILED DESCRIPTION

Figure 1:
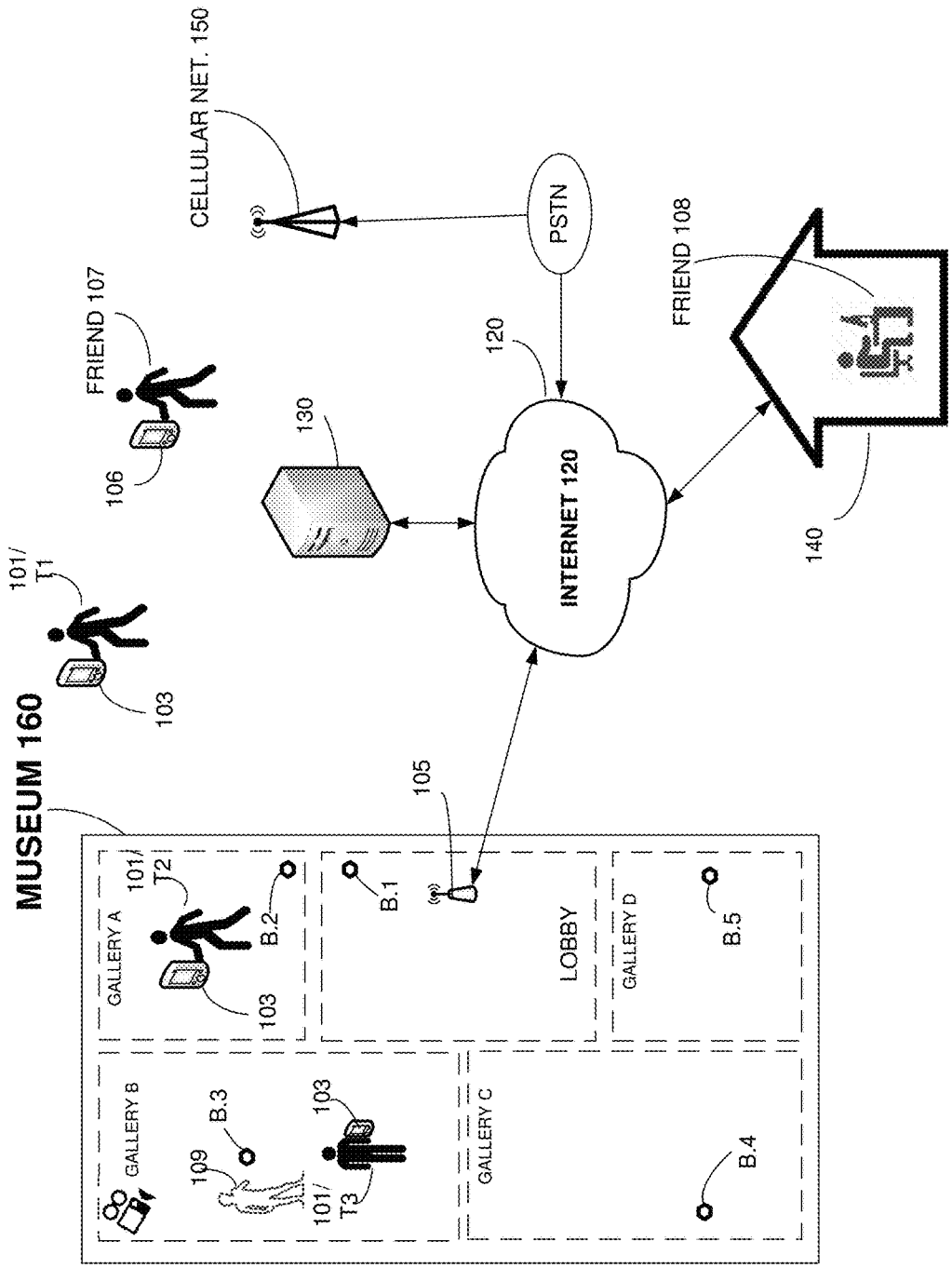
FIG. 1 illustrates the elements comprising an indoor content delivery system 100.

As described earlier, location aware systems have been designed to deliver content that relates to a location that a friendly mobile device user is proximate to. This content is not typically associated with a real-time activity of another friend, and the variety or type of content that can be delivered is generally limited to information entered into the system by a friendly user. For example, a first friendly mobile device user who is proximate to an object at a particular location can comment on their experience about the object at some earlier time. The first friendly user's comments can be stored in the location aware system, and these comments can be associated with information germane to the particular location or object, such as the name and/or description of that location or object. The first user's comments can then be delivered to a second friendly user at a later time when the second user moves proximate to the object at the location that the first user was previously proximate to. Operating in this manner, the location aware system can push/deliver content to the second friendly user or the second friendly user can pull/request content from the system, and the content delivered by the system to the second friendly user can relate an object at to the current location of the second friendly user. While this type of location aware content delivery system operates nicely for some types of social networking applications, it is limited to only delivering content to one or more friendly users that relates to a past activity engaged in by another friendly user that corresponds to a particular location, and it is limited to delivering content based upon a past as opposed to a current activity of another friendly user. Accordingly, it would be advantageous if a location aware content delivery system operated to deliver media content to one (or more) friendly user that relates to a current activity that another friendly user is engaged in at a location to which they are currently proximate.

In this regard, we discovered that a location aware media content delivery system can be configured to deliver rich and varied content to one or more friendly users that is associated with a current activity that another friendly user is engaged in proximate to an object at a known location. The object can be identified as being at a particular geographic location, it can be identified as being proximate to a particular beacon, or it can be identified as matching a captured environmental image. The media content that is delivered may not be content that is generated by one friendly user, but can be content that is created prior to the user engaging in their current activity, and which can be stored in a network device for delivery in real-time to another friendly user. According to this description, current friendly user activity can be any interaction a mobile device user has with their environment, whether the environment is an interior or exterior type environment, and any interaction the mobile device user has with a mobile communication device. Also, the current activity can be related to biometric information about the friendly user that is captured by the mobile communication device. This activity can be characterized by, but not limited to, a mobile device user rate of movement (i.e., standing, sitting or moving around the interior of a venue, such as a museum or some other indoor venue), the activity can be characterized by a friendly user observing, viewing, reading or studying objects comprising the interior or exterior space, such as object of art or any type of object (i.e., walking around a store and viewing merchandise for sale), it can include attending a sporting event, it can include standing, sitting or walking around in an outdoor environment, such as walking down a street in a city or town, or walking through a park for instance, it can include biometric information relating to an emotional response the friendly user has to an object that is captured the mobile communication device, and it can include any interaction the user has with a mobile communication device proximate to a particular location. Information associated with mobile device user activity can be generated by a motion sensor or detected by other sensors operating in conjunction with the mobile device, or the activity information can be generated by user interaction with an application running on the mobile device. The activity information can be characterized, but are not limited to, the current, recent, or recent history of a rate of speed with which the friendly mobile device user (mobile user) is moving, preferences or other settings the user enters into one or more applications running on a mobile communication device, whether or not mobile communication device accessories are being used, and the activity information can be related to biometric information that includes one or more of a heart rate, a respiratory rate, body temperature, eye movement, facial expressions, electrodermal measurements, or other biometric information that can be used to identify an emotion of the friendly user.

As described earlier, a first friendly user can be engaged in an activity at a location (venue) that is in an enclosed area (inside), or engaged in an activity that is in a venue located in the open air (outside), and the media content delivered to another, second friendly user can be content that is created previously and stored in a network device for delivery to the second, friendly user when the first friendly user moves to be proximate to a an object at a particular location corresponding to the previously created content. Optionally, the type of media content delivered to a friendly user can depend upon one or more characteristics of the activity the friendly mobile device user is engaged in. In one embodiment, the friendly user(s) to which media content is delivered depends upon information comprising each of the friendly user profiles. In this regard, one or more of the friendly users can receive the same or different media content depending upon information in their profiles. In another embodiment, media content is delivered or not delivered to one or more of the friendly users depending upon information in each of the friendly user's profile.

Such a location aware media content delivery system is able to provide one or more friendly users with a real-time indication of another friendly user's activity, and the content that is delivered to a friendly user is not limited to content that can be captured or generated in real-time by a mobile device under the control of another friendly user. Further, the system is configured such that it may only deliver media content that is of interest to each friendly user. Still further, the system can deliver media content that relates to a future location and activity that the mobile user is planning to engage in. In this regard, media content can be delivered based on a friendly user's calendar information or an indication of their intention to travel to a particular location to engage in a particular activity at a particular time, and the system can deliver content to a friendly user in anticipation/advance of the mobile user arriving at that location and engaging in the activity at the particular time. From one perspective, the location aware content delivery system operates to deliver media content to one or more friendly users that is an indication of the current activity or future planned activity to be engaged in by another friendly mobile user.

These and other aspects of the location aware content delivery system are described below with reference to the figures, in which FIG. 1 illustrates one embodiment of a location aware content delivery system 100 that operates to detect a current indoor location and activity of three friendly mobile device users 101, 107 and 108. Users 101 and 107 are operating mobile communication devices 103 and 106 respectively and the friendly user 108 is not currently operating a mobile device. The mobile communication devices can be a smart phone, a tablet computer or any easily portable device that is configured to send and receive information to and from the network 120. The user 101 is shown approaching a venue (Museum 160), is shown walking in a Gallery A and is shown standing in Gallery B comprising the Museum 160. The venue 160 has multiple other galleries and a lobby, and each of the galleries and the lobby can have a wireless beacon which is labeled B.1-B.5. The beacons are wireless devices that transmit a low powered signal into their environment that uniquely identifies each beacon. Each beacon can be configured to have a unique identifier, and it can be placed in a known position in the Museum and used as part of a system to determine a current position of the mobile device 103 carried by the user 101. While each gallery in the Museum 160 is shown to have only one beacon, there can be more than one beacon placed in each gallery which has the advantage of allowing an interior positioning system (IPS) to determine, with some degree of accuracy, the current geographic position of a mobile communication device in the interior of the Museum.

In certain instances, a GPS signal may not be available (indoors for example), or beacons may not be deployed. In these cases, and according to another embodiment, a mobile device, such as the mobile device 103, can be configured with image capture hardware and software that permits the device to capture and record image information from its environment. Environmental image information can be periodically captured, sent to network device where it can be used to determine a current location of the mobile device that captures the information. Systems that use image information to determine a current location are known and commercially available, and these systems can employ different methodologies to process the image information to determine a distance between the image capture device and a location that is recognizable by the system. As will be described later, the captured and recorded image information (either still image information or video information) can be transmitted to a server with functionality that operates to identify a current location of a mobile image capture device, and that operates to assist in determining a current activity in which a mobile device user is engaged. In this regard, FIG. 1 illustrates the user 101 approaching the Museum 160 at time T1, entering the Museum and walking through Gallery A at time T2 and standing in Gallery B at time T3. A mobile image capture device 103 carried or worn by the individual can capture and record image information at each of the three times (T1-T3). At time T1, the mobile device 103 can capture an image of the museum name (Museum 160), and as the device 103 moves closer to the museum, the captured museum name image will become larger. This progression of smaller to larger captured images also holds true, for example, of an object 109 image in Gallery B as the device 103 moves into Gallery B and then moves closer to the object 109. This change in of an identifiable object size in a captured image can, for instance, be used by the content delivery system 101 to determine that an individual is approaching (moving closer to) a known/recognizable venue or object. Also, if the image capture device is able to capture 3-D image information, this information can be used to determine distance to the venue.

FIG. 1 also shows a wireless LAN base station 105 located in the lobby of the Museum 160, and the base station is connected to an external network 120 which in this case is the Internet. A legacy telephone network (PSTN), a residence 140, and a networked server 130 are all shown to be linked to the network 120. The PSTN is linked to and supports the operation of a cellular network 150 illustrated in FIG. 1 by a wireless transmission tower. FIG. 1 also shows friendly users 107 and 108 both of which are in control of communication devices that are able to connect to the network 120. The server 130 can be any computational device that is able to be connected to the network 120, and which is capable of running location aware media content delivery (LAMCD) functionality 300 which is described later in detail with reference to FIG. 3.

Generally, the content delivery system 100 in FIG. 1 operates in conjunction with an indoor positioning system (using beacons and mobile communication device technology, using RFID tags and readers), or uses image recognition functionality in order to detect a current location and rate of movement of the mobile device user 101, and to send information corresponding to the current location and rate of movement to the server 130. The server 130 can store a plurality of different types of media content all of which can correspond to a particular location a mobile user is currently proximate to, and it can selectively deliver one or more of the plurality of the types of media content to one or more friendly users, such as the friendly users 107 and 108. The type of media content delivered to a friendly user can be dependent upon a current activity either of the users 101 and 102 are engaged in as characterized by their current or recent geographic position, rate of movement, users 101 and 102 biometric information, and their interaction with a mobile communication device. The different types of media content can be, but are not limited to, audio content, video content, audio and video content, textual content, still image content alone or in combination with audio and text, or any combination of these types of media content.

As described earlier, any one or combination of the plurality of media content types can be delivered to one or more friendly users 107 and 108 based upon a current detected location and activity of a mobile device user 101 and/or 102. The current or recent (historical) location of a mobile user can be determined by either an indoor location position application running on a mobile device or by a similar application running on the server 130, or it can be determined by comparing an image captured by a mobile device with an image at a known location. Based upon the identity of a beacon of known location and the proximity of the mobile user to that beacon, as determined by a signal strength, the position of a mobile device user relative to the beacon can be easily determined. The beacon ID and signal strength information can be sent to the server 130 for processing to determine a mobile device position, or this processing determination can be performed by the positioning application running on the mobile device, and the position information sent to the server 130. A mobile user activity can be determined using the combination of a current or recent location, a rate at which the user is moving, detected user biometric information, and any of their interactions with a mobile communication device. The movement rate of the user can be determined by an accelerometer operating on a mobile device or by the time it takes to move from one beacon to another beacon (beacons B.1 to B.2 for instance), or it can be determined using the captured image information to determine a current rate of movement of the device at the time a message is sent by the device, and the rate of movement can be determined based upon, among other things, a change in size of an object in a series of images captured at known points in time. Content selection logic operating in conjunction with the mobile device 103 or on the server 130 can employ the current position, rate of movement, biometric information, and user interaction information received from the mobile device 103 to determine what type of activity the user is currently engaged in. For example, if the user is not moving and is proximate to the beacon B.3 in Gallery B, then the logic can determine that the user 101 is currently engaged in an activity of standing still while observing an object labeled 109 that is on display in Gallery B, and based upon an emotional state as characterized by user biometric information, the content selection logic can control the server 130 to deliver, or not deliver, to one or both friendly users 107 and 108 a still image of the object 109 and textual or audio information describing the object in some manner. On the other hand, if the system 100 detects that the user 101 is moving rapidly through Gallery B without stopping, then the logic can determine that the user 101 is not necessarily interested in the objects on display in this gallery and it can control the server 130 to deliver video type content that comprises a previously recorded walk through Gallery B. Or, if the system 100 detects that the user 101 is moving at a slow rate through Gallery B without stopping, then the logic can determine that the user may be observing some or all of the objects located in this Gallery, but not interested enough to study each object closely. In this case, the logic can control the server 130 to deliver to one or both friendly users a sequence of still images with audio content that quickly describes each object in the Gallery.

Figure 2:
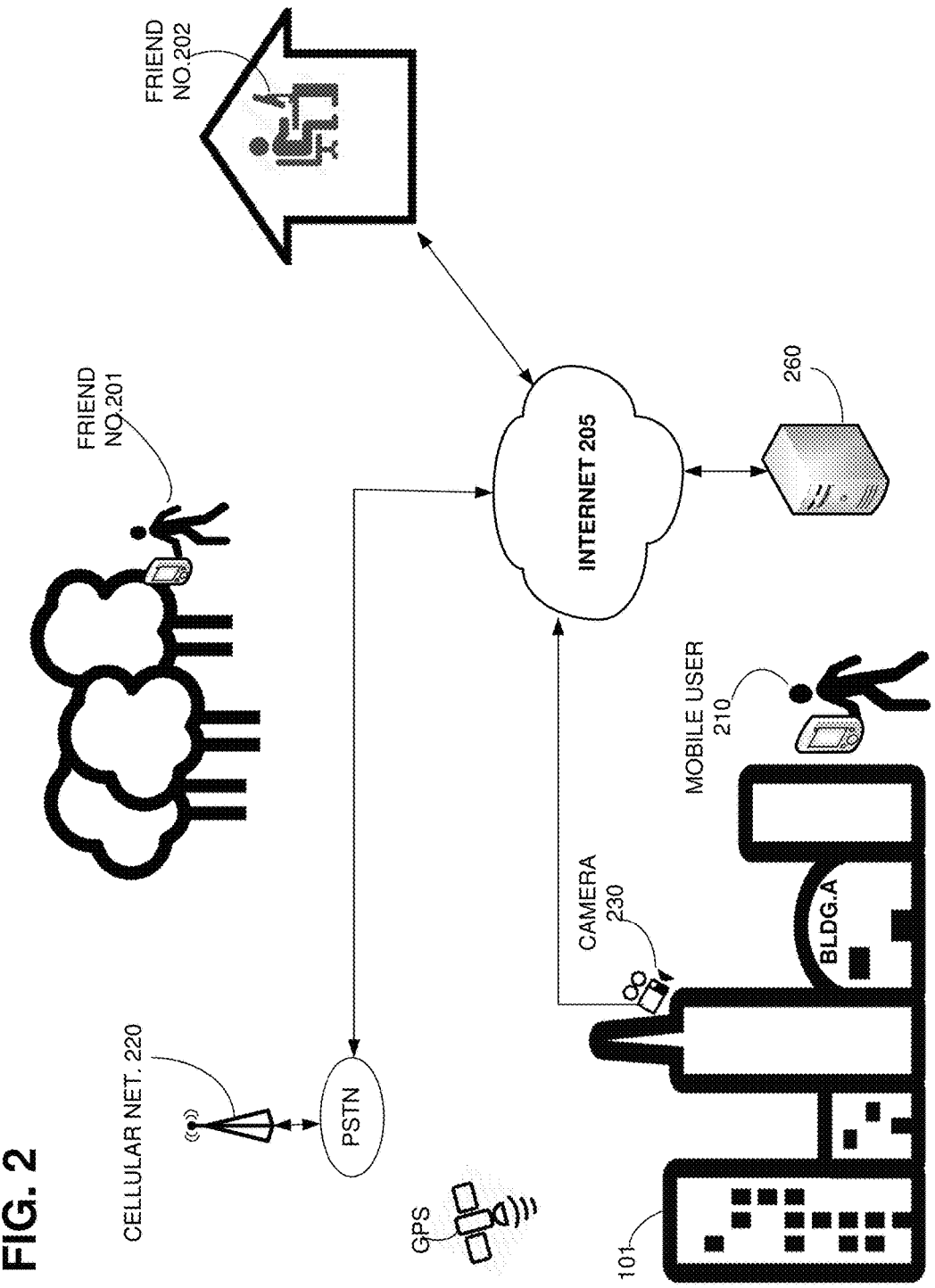
FIG. 2 illustrates the elements comprising an outdoor content delivery system 200.

A detailed description of the functionality that can be employed to determine a current mobile user activity, and that can process activity information to determine what type or types of media content to deliver is described later. As described previously, the delivery of media content is not limited to content that corresponds to an indoor space, but can include media content that corresponds to outdoor space as well. FIG. 2 illustrates a content delivery system 200 that is configured to deliver content corresponding to an outdoor activity engaged in by a mobile user 210. The user 210 is shown moving around an outdoor environment which in this case is an urban environment. The mobile user is in possession of a mobile communication device that runs a geographic positioning system or other type of positioning system application that operates to calculate a current position of the mobile user and device and to send position information to a network server 260 that comprises a location aware content delivery process/functionality. Alternatively, the communication device can be controlled to capture environmental images that can be sent to the server 260 and used to identify a current location of the user 210.

The server 260 in FIG. 2 stores media content that is previously captured by the system 200 and that in this case relates to the outdoor urban environment of interest in which the mobile user 210 is moving through. This media content can be periodically captured and sent to the server by a camera or other device that is capable of capturing any type of media information. In this case, a camera 230 attached to a fixed object is shown that operates to capture environmental image information relating to the urban environment proximate to the mobile user 210. When the server 260 determines that the mobile user is proximate to a particular location, it can operate to deliver stored media content to one or both of the friendly users 201 and 202. The type of media content delivered and the particular content that is delivered can depend upon a profile created by each of the friendly users. Further, and similar to the server 130 functionality described earlier with reference to FIG. 1, the type of media content that can be selected by the delivery functionality running on the server 260 can depend on the rate of motion (i.e., activity) of the mobile user 210. The functional modules comprising the servers 130 or 260 are described below with reference to FIG. 3.

Figure 3:
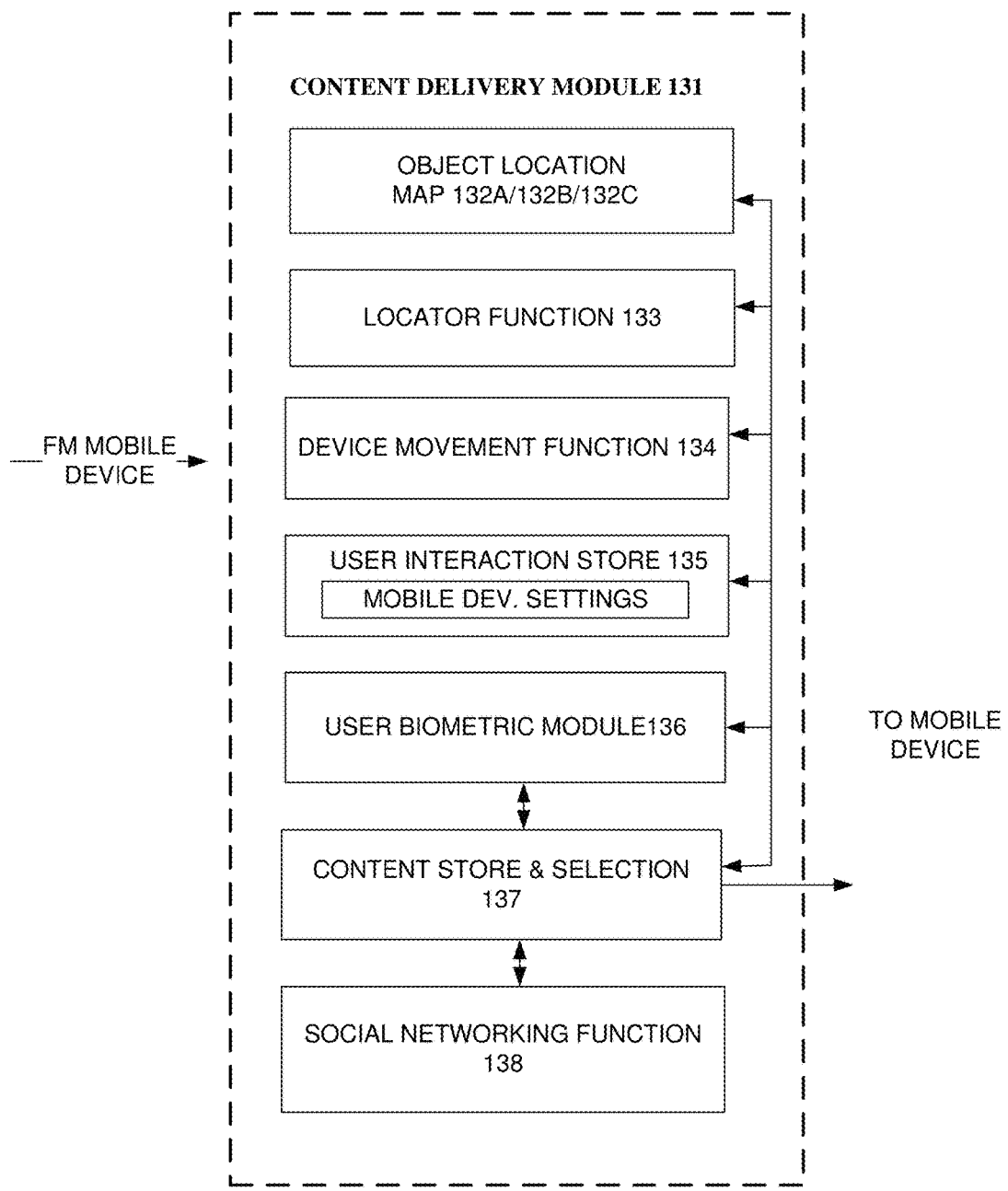
FIG. 3 is a diagram showing functional blocks comprising a server 130 comprising the content delivery system 100 or 200.

FIG. 3 is a diagram illustrating functional blocks implemented in a content delivery module or functionality 131 comprising the server 130 or 260 (hereinafter, server 130). This module operates to deliver content to a mobile application running on a mobile device under the control of a friendly user, such as either of the friendly users 107 and 108 in FIG. 1. The timing of and the type of content delivered to the friendly users depends upon any combination of a current location, a current rate of motion, a recent history of motion location of the mobile device 103, a current activity as characterized by user biometric information, and an interaction a user has with their mobile device. The content delivery module 131 maintains Museum/venue object location maps 132A and 132B that relate a listing of some or all the of objects on display at the venue 160 to physical locations in the venue, and map 132C that relates a plurality of instances of image information to object identity. The content delivery module 131 also has a locator function 133 that is comprised of a store of known GPS locations, indoor positioning system information, a listing having a plurality of instances of information with each instance relating to a single image, and a listing of mobile devices currently connected to the server 130. The content delivery module 131 also has a device movement function 134, it has a store 135 of user interactions with a mobile communication device, it has a user biometric information processing and store function 136, and it has a content storage and selection module 137, and a social networking function 138.

The indoor object location map 132A (described in more detail later with reference to FIG. 4A) includes a listing of the identities of some or all of the objects on display in the museum venue, and it includes the identity of one or more beacons that are located proximate to each object. According to one embodiment, one beacon is positioned proximate to each object on display in the venue, and so the location of the object is determined by the identity of that beacon. According to another embodiment, one or more beacons are positioned proximate to each object, and so the location of each object in the museum is determined by beacon signal strength measurements. Signal strength measurements received from one or more beacons proximate to each displayed object can be recorded and entered into the map in association with that object. As described earlier, each beacon is assigned a unique identifier that each beacon periodically or continually transmits in a low power signal. A mobile device that is configured to receive a beacon signal can determine the identity of each beacon using this unique identifier, and by detecting a beacon signal strength is able to determine how far the object is from each of one or more beacons. This distance information is then stored in the map in association with the object that is positioned proximate to the location in which the beacon signal strength is recorded. It should be understood, that while the embodiment described herein uses beacon technology as means to determine an interior location, other interior location systems can also be employed for this purpose.

Continuing to refer to FIG. 3, the mobile device locator function 133 operates on information received from a mobile device to determine either or both of a current interior location and a current exterior location of a mobile device, such as the mobile device 103 in FIG. 1 or the mobile device in the possession of the mobile user in FIG. 2, and it detects and maintains a listing of the mobile devices that are currently connected to the server 131. Depending upon the correspondence of beacons to displayed objects (one beacon proximate to one object or multiple beacons proximate to one object), the function 133 can receive information that uniquely identifies a particular beacon, and it can receive signal strength information corresponding to multiple beacons as measured by a mobile device. The locator function 133 can use this beacon identity and signal strength information to determine the current interior location of the mobile device, and then store this location. The function 133 can also receive GPS location information from the mobile device, and it can receive captured environmental image information from the mobile device and store this information.

The device movement function 134 in FIG. 3 operates to receive motion information generated by an accelerometer operating on a mobile device that corresponds to a current rate of movement of the mobile device and it can operate to receive a sequence of image information that can be used to determine a rate of movement. This current movement information can be stored and used by logic comprising a content store module 136 to determine what type of content to deliver to the mobile device. The movement function 134 can also receive information from the locator function 133 that corresponds to how much time is spent at any particular location in the museum, such as the time spend proximate to an object (lingering time) on display.

Continuing to refer to FIG. 3, the store 135 of user interactions with a mobile communication device maintains a record of current or recent history of interaction that a user has with their mobile device. This can include, but is not limited to, user interaction with mobile applications, device settings entered by the user such as preferences or language, and it can include the use of accessories with the mobile device. The user biometric module 136 generally operates to receive biometric information in a message from a mobile device, parse the message to identify one or more different types of biometric information and to determine from which mobile device it is sent, and to maintain the parsed biometric information in a store associated with a particular mobile communication device. This biometric information can be maintained in separate files, each separate file being associated with a different mobile communication device. While the biometric module 136 is described here as being implemented on the server 130, it can also run on a mobile communication device, as described later with reference to FIG. 10. The content store and selection module 137 maintains a plurality of instances of media content, and each instance of the content can be included in a separate file that corresponds to information corresponding to locations and objects at those locations relating to a particular venue. Each instance of media content can be comprised of one or more types or sub-instances of the media content, and each content type can be stored in similar or different media formats. Each instance of media content is created/generated or captured by an appropriate content capture device, such as a still or video camera, a microphone, a computational device, or any type of electronic or mechanical device with the capability of capturing or generating media content. The content captured by the device is sent to and maintained by the server 130 in any type of appropriate storage device, such as disk, memory or other type of electronic storage means. The media content that is stored at the server 130 is not content that is generated by a mobile device user at the time they are engaged in an activity at a location associated with the stored media content, but it is content that is generated or captured prior to any user activity that is proximate to a particular object of interest, and the media content is not generated as the result of the user activity. In addition to storing the media content, the content store and selection module 136 has logic that selects an instance of content and an associated type of content that is delivered to each friendly user. This selection is based upon any one or more of the current or future mobile device location, current user biometric information, current or recent history of a rate of movement, interaction that the mobile device user has with the device, and a friendly user identity and profile. FIGS. 4A, 4B, 4C, 5, 6,7, and 8 and the following description provide detail about the functional elements comprising the content delivery module 131.

Turning now to a description of the indoor object location map 132A shown with reference to FIG. 4A. This map maintains a listing of the beacon identities in the venue and the identity of each object that is positioned proximate to each beacon. According to one embodiment, a single beacon is positioned proximate to one object on display in the venue, and accordingly, there is a unique correspondence in the map between one beacon and one object on display. Information maintained in this map is used by content selection logic comprising the content deliver module 136 (described later with reference to FIG. 7) in order to determine which displayed object a mobile device is proximate to. FIG. 4B illustrates a map 132B that the system 200 can use in the event that a mobile user is engaging in an outdoor activity, and FIG. 4C is a map 132C that maintains a listing of a plurality of instances of an image information and a correspondence between each image and the identify of an object that can be located indoors or outdoors.

Figure 5:
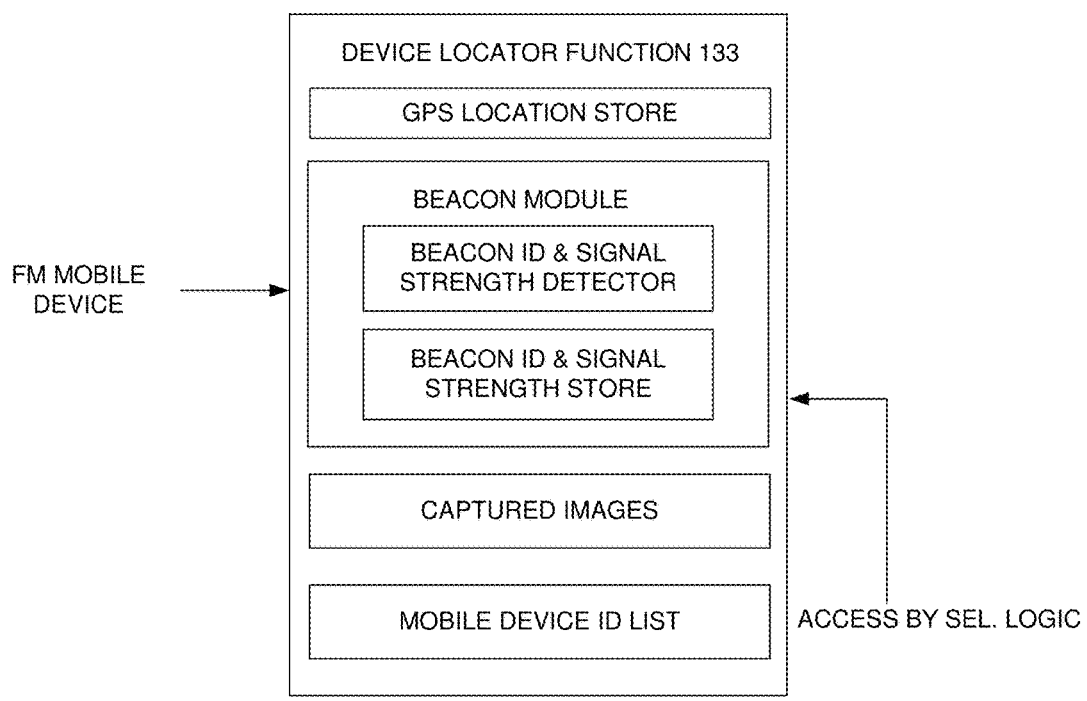
FIG. 5 is a diagram showing functional blocks comprising a device locator function 133.

FIG. 5 illustrates the elements comprising the device locator function 133. This function has a store of GPS location information that the server 130 receives from a mobile device (103 for instance), it has a beacon module that is comprised of a beacon identity and signal strength detector, and a store of beacon identities and associated detected signal strengths, it maintains a listing of captured environmental images sent to it by the mobile device, and it has a listing of the mobile devices that are currently connected to the server 130. When a mobile device, running an appropriate mobile application, comes into range of a signal transmitted by a particular beacon, the mobile application detects a unique identity of the beacon in the signal, it detects a strength of the signal transmitted by the beacon, and then sends this beacon identity information and signal strength information to the device locator function 133 operating in association with the content delivery module 131 running on the server 130. In operation, the function 133 receives GPS information, beacon identities and signal strengths, captured image information and the identities of mobile device information from the mobile devices, and this information can be accessed by the content selection logic and used by the logic as a pointer into the map 132 for the purpose of determining which object a mobile device is proximate to in order to determine which instance of media content should be selected for delivery to a friendly user.

FIG. 6 illustrates the functional elements comprising the device movement function 134, which operate to process accelerometer information and to store the processed accelerometer information, and which operate to process sequences of images captured by the mobile device at known times to determine a rate of movement of the device. This function 134 receives rate of movement information from a mobile device, and it can receive current mobile device location information, and then process this information in different ways. For instance, it can calculate an average rate of movement of a mobile device over a selected/configurable period of time in selected venue locations, it can calculate the period of time that a mobile device lingers proximate to an object on display, it can calculate the varying rates of movement through different galleries or between galleries to name only a few of the different calculations possible given mobile device movement and location information. Accelerometer information stored by function 134 can be accessed by the content selection logic and used to determine what type of content can be delivered to a friendly user. As described above, the function 134 can also receive a sequence of environmental image capture by the mobile device 103 at known times, and a rate of movement can be calculated based upon the relative rate at which a size of an object changes from one image in a sequence to another image in the sequence or a rate of movement can be calculated based upon know locations of objects that are identified in a sequence of images.

FIG. 7A is a block diagram of functionality comprising the user biometric module 136 showing a biometric parsing function 136A, a biometric processing function 136B, and some number of biometric files 136C, with each file having biometric information that is received from one particular mobile communication device. The parsing function generally operates to receive information comprising a message from a mobile device and to detect the different types of biometric information in the message, and to detect the identity of the mobile device that sent the message. The parsing function sends the parsed biometric information to the file 136C corresponding to the mobile device ID, where the latest and previous biometric information is maintained and available to the biometric processing function 136B, and to the content store and selection module 137. The biometric processing function 136B operates on the biometric information in the files 136C, and on information obtained from the device movement function 134, to determine an average or normal value for each type of biometric that is being monitored, or determine a normal image in the case that the biometric is a facial expression. Each file 136C comprises a sufficient amount of biometric information (i.e., maintain historical biometric information for a 24-hour period, or maintain a selectable volume of information, regardless of a time period) for a normal biometric value to be calculated by the function 136B. The amount of biometric information that is maintained, or the period of time over which the information is maintained can be fixed, or can be selected by the mobile communication device user. For example, the function 136B can determine an average or normal heart rate (HR) for the mobile device user by monitoring device user movement and heart rate (HR) information received over a selected period of time, and calculate an average or normal HR value during those times that that user is not moving, or is moving slowly. Other normal biometric values can be similarly calculated, such as for a normal respiratory rate, or for a normal temperature for different areas of a device user's body, or for normal eye movement or facial expressions associated with reading printed material proximate to an object or observing an object respectively.

Continuing to refer to FIG. 7A, the biometric processing function 136B is comprised of logic that operates on the biometric information maintained in one or more of the files 136C to calculate a normal value for each biometric type. This normal value can be calculated as an average value or a median value over the period of time that the biometric information is collected, or it can be based upon some volume of information. This normal value is then sent to the appropriate mobile device file 136C where it is maintained for use.

Figure 7B:
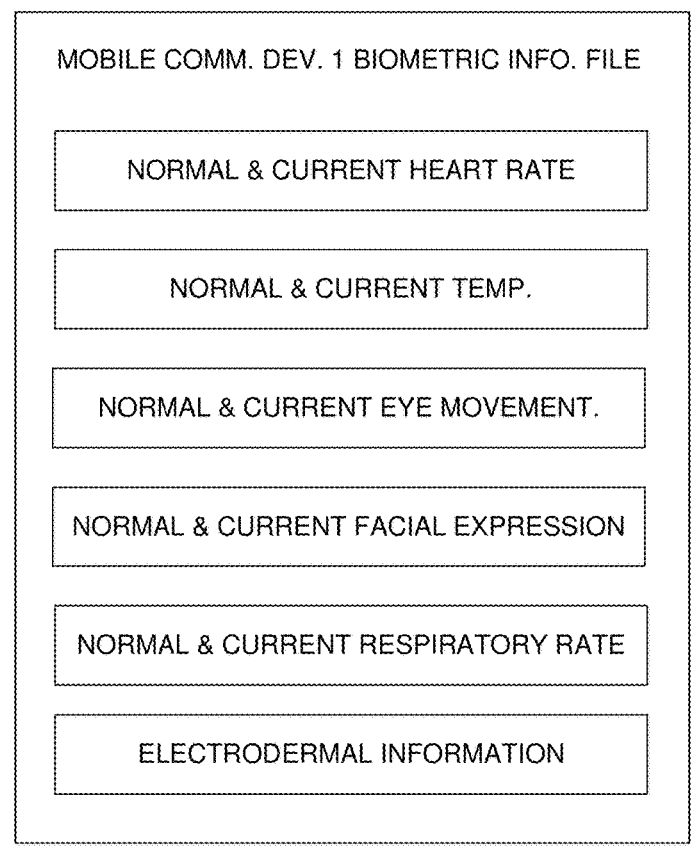
FIG. 7B is a diagram showing information stored in a biometric information file.

FIG. 7B is a diagram showing the different types of biometric information that can be maintained in a mobile communication device file. While this file maintains six different types of biometric information, more or fewer types of information can be maintained in a file, but each does include information associated with at least one type of biometric, and the information associated with each biometric is comprised of the normal biometric value, a history of past biometric values detected by a mobile device and sent to the biometric module 136, and it includes the current or latest biometric information sent by the mobile device. In operation, the biometric processing function 136B comprising the biometric module 136 can examine the biometric information in a biometric information file looking for current biometric information that may be at variance to normal biometric information, and depending on the degree to which a current biometric value is greater or less than a normal biometric value, the module 136 can determine that the mobile communication device user likes or does not like something relating to their current location. As will be described later with reference to FIG. 11, the content delivery module 131 can use this determination to control whether or not content is delivered to a friendly user.

Figure 8:
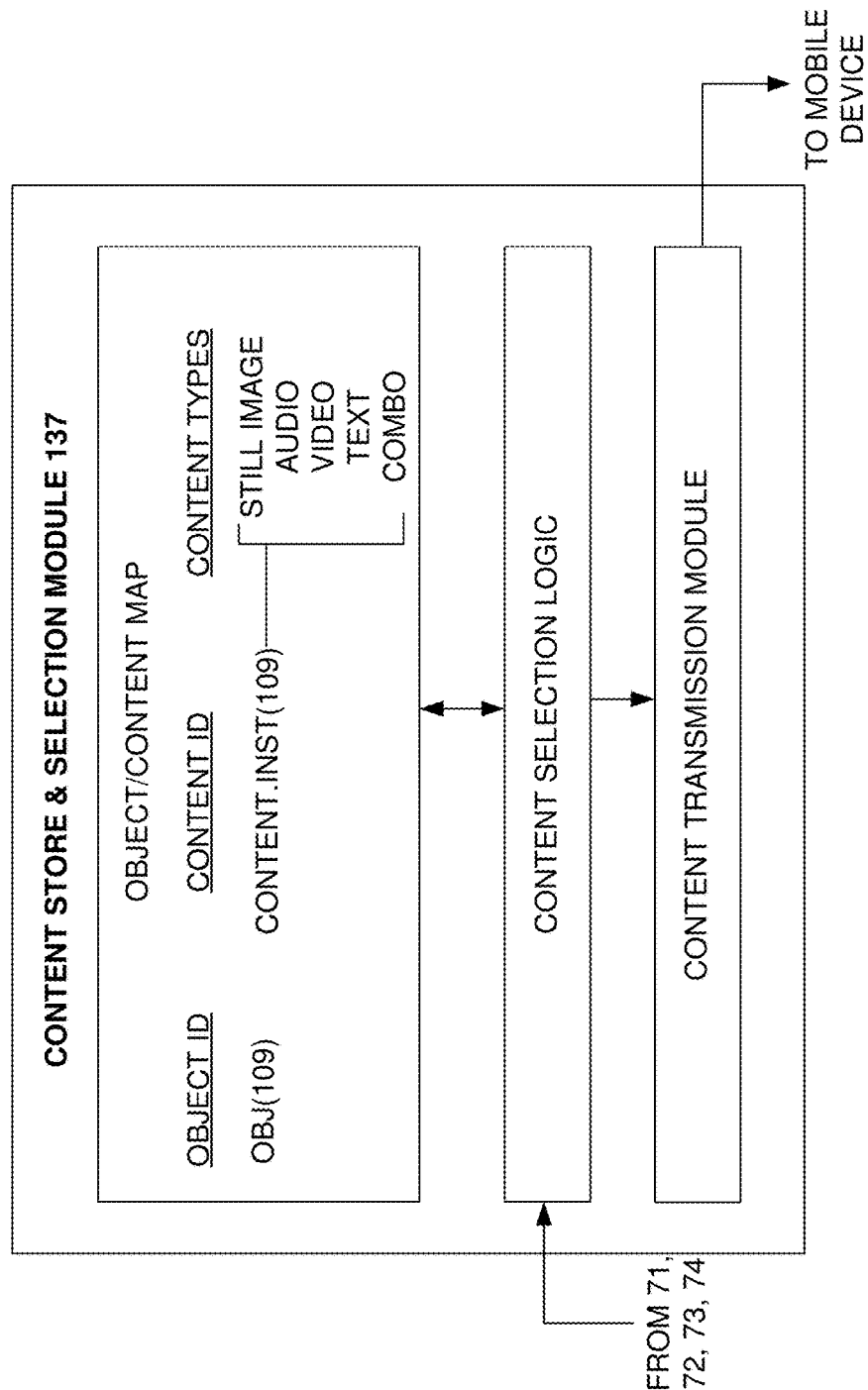
FIG. 8 is a diagram showing functionality comprising a content store and selection module 137.
Figure 9:
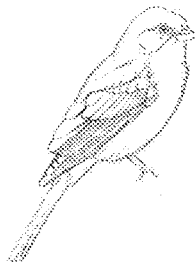
FIG. 9 illustrates the format of an instance of media content.

FIG. 8 illustrates functional elements comprising the content storage and selection module 137. This module has a map or structure that relates each object associated with the venue to the identity of an instance of media content, which content identity in turn relates to the identity of one or more different types of media content that is stored in a database structure (not shown). Each different type of media content associated with an instance of content can be stored in a separate file, and each separate file can be identified by an appropriate label, such as Still Image, Audio, Video, Textual, or a Combination of media types to name only a few. An example of an instance of content is illustrated with reference to FIG. 9. While only five different types of content are described here, fewer types or more types of content can be created and stored in association with the module 137. Module 137 also has logical instructions (labeled content selection logic) that operate to determine whether content should be delivered to a friendly user or not, and if content is to be delivered, it operates to select the appropriate instance of content and content type for delivery to a friendly user depending upon location and movement information associated with the mobile user device, such as the devices 103 in FIG. 1. This content selection logic operates on information maintained in the user biometric module 136, the object location map 132, the locator function 133, the device movement function 134, and the social networking function 135 to determine whether, and which instance of content and what type of content is to be delivered to a friendly user. The operation of this logic to determine whether to deliver and when to deliver content, what type of content to deliver and to which friendly user the media content is to be delivered is described later in detail with reference to FIG. 11. The content storage and selection module 137 also has a content transmission module that operates to send content to the appropriate mobile device at the appropriate time.

Figure 10:
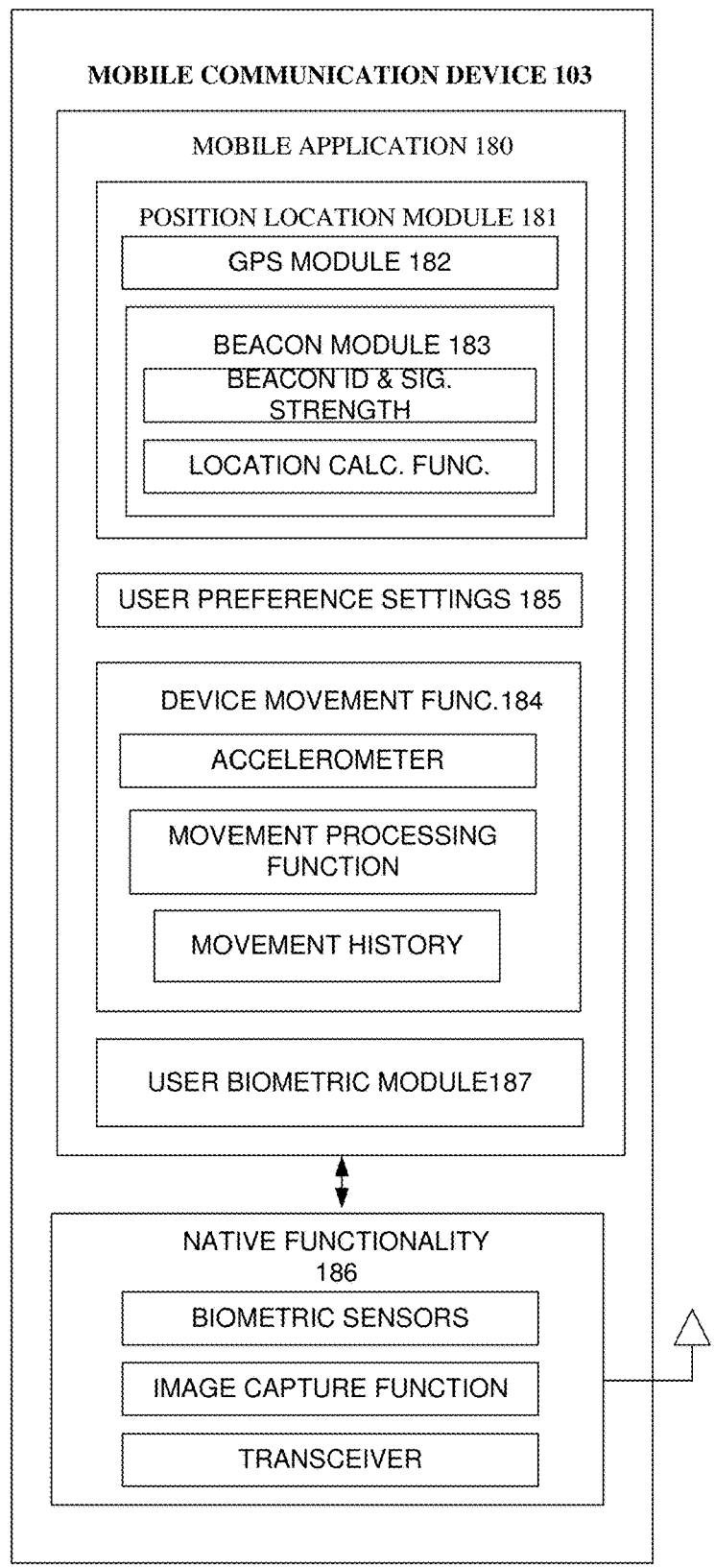
FIG. 10 is a diagram illustrating functionality comprising a mobile communications device.

FIG. 10 is a block diagram showing functional elements comprising either of the mobile communication devices 103 described earlier with reference to FIG. 1. Mobile device 103 generally is comprised of the mobile application referred to previously and which is labeled here as mobile application 180, and the mobile device also has functionality 186 that is native to the mobile device. This native application functionality can include, but is not limited to, a wireless transceiver or radio that operates to send and receive wireless messages to and from a wireless network to which it is connected, it can include functionality to play/display media content received from the server 130, and it can include functionality that operates to capture still or video image information. The mobile application 180 is comprised of a position location module 181, a device movement function, and the user biometric module described earlier with reference to FIG. 3 and labeled here as module 187, and it generally operates to receive information from a GPS network or an indoor positioning system, and to either calculate a geographic position or send the unprocessed GPS or Beacon information to the server 26 which uses this information to calculate a current position of the mobile device. More specifically, the position location module 181 has a GPS module 182 that operates (generally when the mobile device is open to the air) to receive signals from a GPS satellite, and use information in this signal to calculate a current geographic position of the mobile device. The position location module also has a beacon module 183 that generally operates to receive beacon signals and determine the identity of the beacon that sent the signal, and to determine the current beacon signal strength, and the beacon ID and signal strength can be sent to the server 130 which uses this information to determine the current location of the mobile device.

Continuing to refer to FIG. 10, the device movement function 184 has an accelerometer, a movement processing function and a store of movement history. The accelerometer generally operates to detect a rate of movement, or rate of change of movement of the mobile device 103 as it moves (is carried) around a venue. Information indicative of movement generated by the accelerometer is sent to the server 130 where the information is used to calculate a current rate of movement. Alternatively, if the mobile device is not currently connected to a wireless network, the function 184 can process the accelerometer information to determine a current rate of movement of the mobile device and store this information in a movement history. The mobile application 180 can also have functionality 185 that supports a user entering preferences for receiving media content from the server 130. Preferences in this context can mean, but is not limited to, selected friendly users from which a user will accept content from, the types of content the user will accept, the times that a user will accept content, the locations at which the user will accept content. Finally, mobile communication device 103 can also have native functionality 186 comprised of biometric sensors, an image capture function, such as a digital camera, and it can have a transceiver for receiving and sending signals. The biometric sensors can include, but are not limited to, a body temperature monitor, a heart rate monitor, a respiratory monitor, or other biometric monitors.

As described earlier, the content delivery module 300 running on the server 130 operates to store a plurality of media content instances, and each instance of content can comprise one or more types of content. To identify an appropriate content instance and type of content comprising the instance of content to send to one or more friendly users, the server 130 receives location (beacon, GPS or image information) and activity information from a mobile device being operated by another friendly user. This activity can be characterized by, but not limited to, an emotional state of the user, whether the user is standing, sitting or moving around the interior of a venue, such as a museum or some other indoor venue, and observing, viewing, reading or studying objects comprising the interior or exterior space, such as object of art or any type of object (i.e., walking around a store and viewing merchandise for sale), it can include attending at a sporting event, it can include standing, sitting or walking around in an outdoor environment, such as walking down a street in a city or town, or walking through a park for instance. Information associated with mobile device user activity can be generated by a motion sensor, an image sensor or other biometric sensors operating in conjunction with the mobile device or the activity information can be generated by user interaction with an application running on the mobile device. The activity information can be characterized by, but is not limited to, the current or recent rate of speed with which the friendly mobile device user (mobile user) is moving, a current temperature of a body part, a current HR and/or respiratory rate of a mobile device user, a recent pattern of eye movement or facial expression, or other biometric information. Logic instructions comprising the content selection module 136 operates on the location and the activity information, and on information comprising a friendly user profile, to determine the appropriate media content to deliver to each friendly user.

The operation of the selection logic is now described with reference to FIG. 11, where in Step 1 the logic determines whether or not new or updated information relating to a current location of a mobile device (such as the device 103 in FIG. 1) is received. The mobile device can be configured to transmit this information at periodic intervals to the server 130 where it can be stored and accessible to the logic for examination. If location information is received, then in Step 2 the logic compares this information to the location of objects stored in an appropriate map 132A, 132B or 132C, and in Step 3 the logic determines whether or not the received location information corresponds to a known location (beacon location, GPS coordinate or image instance), and if so, the logical process proceeds to Step 4. Otherwise the process returns to Step 1. In Step 4, the logic determines whether or not any recent/current movement information is received by the server 130, and if so, then the logical process proceeds to Step 5 where the logic can use the movement information, information associated with a user's interaction with their mobile device, and/or biometric information to determine what type of activity the mobile user is currently or recently engaged in and whether the current emotional state of the user has changed from a normal state. On the other hand, if no recent movement information is received, then the process loops on Step 4 indefinitely, or for a selected time out period. An emotional state change can be detected if any of the biometric values changes by more than a threshold value. So, for example, if the mobile device users normal HR is 75 beats per minute, and their current HR is 90 or 50, the logic can conclude that the emotional state of the user has changed. A state change threshold value can be selected, and if a current biometric value is not greater than the state change threshold value, then the logic can determine that there is no change in emotional state. The selected state change threshold values can be maintained in the biometric module 136 running on the server 130, or as described later with reference to FIG. 10, the selected threshold values can be maintained in the biometric module 187 running on the mobile device 103.

Continuing to refer to FIG. 10, after determining what type of activity the user is engaged in and whether the emotional state has changed, the logical process proceeds to Step 6 where the logic determines whether the emotional state change is a positive change (i.e., the user is currently enjoying or happy about some aspect of an object that they are proximate to) or a negative change (i.e., the user is not enjoying some aspect of an object that they are proximate to). Whether the change in biometric information is indicative that the emotional state change is from a neutral state to a positive or negative state can be subjective, and learned by the logic over time. This logic may have to examine the information associated with several biometrics before coming to a determination that a user is undergoing a positive or negative emotional state change. If the logic determines that the emotional state change of the user is positive, then the process proceeds to Step 7, otherwise the logic determines that no content is delivered to any friendly users.

Figure 11B:
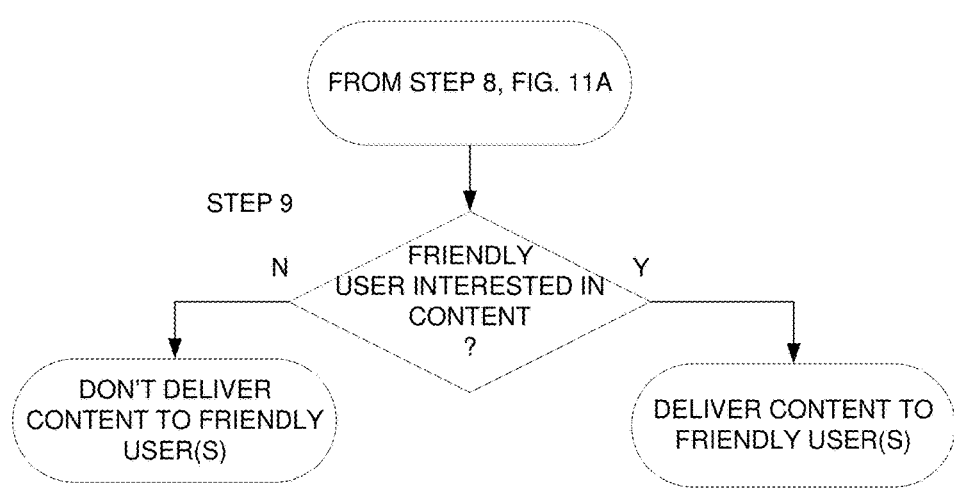

Continuing to refer to FIG. 11A, in Step 7 the logic searches for an instance of content corresponding to the current location, and uses the activity information to identify what type of media content to send to one or more friendly users. Optionally, and in Step 8, the logic can examine one or more friendly user profiles and in Step 9 use information in a profile to determine whether or not to send the identified media content, and to determine what type of media content to send to each one of the friendly users.

The forgoing description, for purposes of explanation, used specific nomenclature to provide a thorough understanding of the invention. However, it will be apparent to one skilled in the art that specific details are not required to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of delivering media content, comprising:
   maintaining, in a non-transitory computer readable medium associated with a computational device connected to a network, a plurality of media content instances each instance of which is generated at a first time and is associated with an object at a first location;
   detecting at a second time that is subsequent to the first time, by a mobile communication device associated with a first mobile communication device user, information that is indicative of a current location and a current rate of movement of the first mobile communication device, and detecting at the second time an emotional response by the first mobile communication device user to an object at the current location, and sending the current location information, movement information and the emotional response over the network to a content delivery process embodied in logical instructions maintained in a non-transitory computer readable medium associated with the computational device;
   receiving, by the content delivery process, the information that is indicative of the current location, the current rate of movement, and the emotional response of the first user, and identifying at least one instance of media content among the plurality of instances of media content that is both associated with the object at the current location and which is based upon the received first mobile communication device user rate of movement information; and
   delivering, by the content delivery process, the identified at least one instance of media content to a second mobile communication device user if the emotional response is positive, and not delivering the identified media content if the emotional response is negative.

2. The method of claim 1, further comprising identifying the at least one instance of media content based upon one or more preferences selected by the second mobile communication device user.

3. The method of claim 2, wherein the one or more preferences selected by the second mobile device user comprise any one or more of a listing of friendly users from which a user will accept content, a listing of the content types the second user will accept, a listing of the times that the second user will accept content, and a listing of the locations at which the second user will accept content.

4. The method of claim 1, wherein the information indicative of a location is received from an outdoor positioning system, an indoor positioning system or is environmental image information captured by the mobile communication device.

5. The method of claim 4, wherein the environmental image information is comprised of one or a sequence of still images or video image information.

6. The method of claim 5, wherein the still image information is three dimensional still image information.

7. The method of claim 6, wherein the three dimensional still image information is used to calculate a distance to an identified object of interest comprising the image.

8. The method of claim 1, wherein the information corresponding to the rate of movement of the first mobile communication device user is information indicative of the first mobile communication device user standing, sitting or walking around in an indoor or outdoor environment.

9. The method of claim 1, wherein the type of media content delivered by the content delivery process to the second mobile communication device user is dependent upon the rate of movement of the first communication device user and is any one or a combination of textual information, still image information, audio information, and video information relating to the object the first mobile communication device user is proximate to.

10. A media content delivery system, comprising:
    a computational device running a content delivery process embodied in logical instructions stored in a non-transitory computer readable medium, wherein the computational device is connected to a network and the content delivery process operates to maintain a plurality of media content instances, each instance of which is generated at a first time and has media content associated with an object at a known location; and
    a plurality of mobile communication devices all of which are connected to the network, and a first one of the plurality of the mobile communication devices operating at a second time that is subsequent to the first time to detect information that is indicative of a current location, a current rate of movement, and an emotional response of a first mobile communication device user to an object at the current location, and sending this information over the network to the content delivery process running on the computational device; and
    wherein the content delivery process running on the computational device operates on the current location information and the current first mobile device user rate of movement information received from the first mobile communication device to determine that the first mobile communication device user is proximate to an object that corresponds to a known location and that the first mobile communication device user is moving at a particular rate of speed, and identifying at least one instance of media content among the plurality of the instances of media content that is both associated with the object at the current location and which is based upon the current rate of movement of the first mobile communication device user, and delivering the identified at least one instance of media content to a second one of the plurality of the mobile communication devices if the emotional response is positive, and not delivering the identified media content if the emotional response is negative.

11. The system of claim 10, further comprising the media content delivery process identifying the at least one instance of media content based upon one or more preferences selected by a user of the second one of the plurality of the mobile communication devices.

12. The method of claim 11, wherein the one or more preferences selected by a user of the mobile communication device comprises any one or more of a listing of friendly users from which a user will accept content, a listing of the content types the user will accept, a listing of the times that the user will accept content, and a listing of the locations at which the user will accept content.

13. The method of claim 10, wherein the information indicative of a current location is received from an outdoor positioning system, an indoor positioning system or is environmental image information captured by the mobile communication device.

14. The method of claim 13, wherein the environmental image information is comprised of one or a sequence of still images or video image information.

* * * * *